(12) United States Patent
Geirhofer et al.

(10) Patent No.: US 9,137,802 B2
(45) Date of Patent: Sep. 15, 2015

(54) DL MU-MIMO OPERATION IN LTE-A

(75) Inventors: Stefan Geirhofer, San Diego, CA (US); Amir Farajidana, San Diego, CA (US); Tingfang Ji, San Diego, CA (US); Alexei Yurievitch Gorokhov, San Diego, CA (US); Anastasios Stamoulis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 12/857,112

(22) Filed: Aug. 16, 2010

(65) Prior Publication Data

US 2011/0194593 A1 Aug. 11, 2011

Related U.S. Application Data

(60) Provisional application No. 61/234,878, filed on Aug. 18, 2009.

(51) Int. Cl.
*H04W 4/00* (2009.01)
*H04W 72/04* (2009.01)
*H04W 72/08* (2009.01)

(52) U.S. Cl.
CPC ........ *H04W 72/048* (2013.01); *H04W 72/0413* (2013.01); *H04W 72/085* (2013.01)

(58) Field of Classification Search
CPC ............ H04W 72/0413; H04W 72/08; H04W 72/085
USPC ................. 370/241–252, 328–333, 341–348; 375/260–265
See application file for complete search history.

(56) References Cited

U.S. PATENT DOCUMENTS

| 8,208,364 B2 | 6/2012 | Walton et al. |
| 8,380,212 B2* | 2/2013 | Sohn et al. ..................... 455/450 |

(Continued)

FOREIGN PATENT DOCUMENTS

| CN | 101453259 A | 6/2009 |
| EP | 2214338 | 8/2010 |

(Continued)

OTHER PUBLICATIONS

Caihua Zhang, et al., "Robust MMSE Beamforming for Multiuser MISO Systems With Limited Feedback", IEEE Signal Processing Letters, IEEE Service Center, Piscataway, NJ, US, vol. 16, No. 7, Jul. 1, 2009, pp. 588-591, XP011254905, ISSN: 1070-9908 paragraph [000I]—paragraph [00II].

(Continued)

*Primary Examiner* — Kan Yuen
(74) *Attorney, Agent, or Firm* — Tyler J. Overall

(57) ABSTRACT

Techniques for scheduling UEs are described. In one design, a scheduler (e.g., for a cell) may receive channel direction information (CDI) and channel strength information (CSI) from a plurality of UEs. In one design, the CDI from each UE may include at least one eigenvector, and the CSI from each UE may include at least one singular value corresponding to the at least one eigenvector. The scheduler may schedule at least one UE among the plurality of UEs for data transmission based on the CDI and CSI from the plurality of UEs. The scheduler may select the at least one UE based on a metric related to signal-to-leakage ratio (SLR), or spectral efficiency, etc. In one design, the scheduler may evaluate the performance of different sets of UEs to determine whether to schedule one UE for single-user MIMO or multiple UEs for multi-user MIMO.

13 Claims, 5 Drawing Sheets

(56) References Cited

U.S. PATENT DOCUMENTS

| | | | |
|---|---|---|---|
| 2005/0032521 A1 | 2/2005 | Lee et al. | |
| 2006/0256761 A1* | 11/2006 | Meylan et al. | 370/338 |
| 2007/0049218 A1 | 3/2007 | Gorokhov et al. | |
| 2007/0223423 A1 | 9/2007 | Kim et al. | |
| 2008/0013610 A1 | 1/2008 | Varadarajan et al. | |
| 2008/0025336 A1* | 1/2008 | Cho et al. | 370/432 |
| 2008/0132281 A1 | 6/2008 | Kim et al. | |
| 2008/0159425 A1 | 7/2008 | Khojastepour et al. | |
| 2008/0285664 A1 | 11/2008 | Wallace et al. | |
| 2008/0291851 A1 | 11/2008 | Guthy et al. | |
| 2008/0317145 A1 | 12/2008 | Clerckx et al. | |
| 2009/0046800 A1 | 2/2009 | Xu et al. | |
| 2009/0147736 A1* | 6/2009 | Chen et al. | 370/329 |
| 2009/0296650 A1* | 12/2009 | Venturino et al. | 370/330 |
| 2009/0316802 A1* | 12/2009 | Tong et al. | 375/260 |
| 2010/0103832 A1* | 4/2010 | Zhou et al. | 370/252 |
| 2010/0189054 A1* | 7/2010 | Youn et al. | 370/329 |
| 2012/0033756 A1* | 2/2012 | Khojastepour et al. | 375/267 |
| 2012/0039207 A1* | 2/2012 | Eriksson et al. | 370/252 |

FOREIGN PATENT DOCUMENTS

| | | |
|---|---|---|
| JP | 2003258770 A | 9/2003 |
| JP | 2005057778 A | 3/2005 |
| JP | 2005520362 A | 7/2005 |
| JP | 2005323217 A | 11/2005 |
| JP | 2006504339 A | 2/2006 |
| JP | 2007215044 A | 8/2007 |
| JP | 2008306713 A | 12/2008 |
| JP | 2008306732 A | 12/2008 |
| JP | 2009033744 A | 2/2009 |
| JP | 2009506729 A | 2/2009 |
| JP | 2009141957 A | 6/2009 |
| JP | 2009177616 A | 8/2009 |
| JP | 2009530987 | 8/2009 |
| JP | 2009532000 A | 9/2009 |
| JP | 2010504712 A | 2/2010 |
| JP | 2010537597 A | 12/2010 |
| JP | 2011514690 A | 5/2011 |
| JP | 2011517373 A | 6/2011 |
| WO | 03005725 A2 | 1/2003 |
| WO | 2006106693 A1 | 10/2006 |
| WO | 2007041845 A1 | 4/2007 |
| WO | 2007109630 A1 | 9/2007 |
| WO | 2007115236 A2 | 10/2007 |
| WO | 2008037317 A1 | 4/2008 |
| WO | 2009023681 | 2/2009 |
| WO | 2008152612 A3 | 3/2009 |
| WO | 2009026770 A1 | 3/2009 |

OTHER PUBLICATIONS

CATT: "Analysis of Feedback Signalling for Downlink CoMP", 3GPP Draft; R1-091520, 3RD Generation Partnership Project (3GPP), Mobile Competence Centre; 650, Route Des Lucioles; F-06921 Sophia-Antipolis Cedex; France, no. Seoul, Korea; Mar. 18, 2009, XP050339079, [retrieved on Mar. 18, 2009] paragraph [0001]—paragraph [02.3].

International Search Report and Written Opinion—PCT/US2010/045779, International Search Authority—European Patent Office—Nov. 29, 2010 (093273).

Ozbek B, et al., "Reduced Feedback Designs for SDMA-OFDMA Systems", Communications, 2009. ICC '09. IEEE International Conference on, IEEE, Piscataway, NJ, USA, Jun. 14, 2009, pp. 1-6, XP031506374, ISBN: 978-1-4244-3435-0 paragraph [00IV]—paragraph [000V].

Qualcomm Europe: "Signaling for spatial coordination in DL CoMP", 3GPP Draft; R1-092057 Signaling for Spatial Coordination in DL Comp, 3RD Generation Partnership Project (3GPP), Mobile Competence Centre; 650, Route Des Lucioles; F-06921 Sophia-Antipolis Cedex; France, no. San Francisco, USA; Apr. 28, 2009, XP050339516, [retrieved on Apr. 28, 2009] paragraph [0003].

Sohn I, et al., "Dynamic Channel Feedback Control for Limited-Feedback Multi-User MIMO Systems", Communications, 2009. ICC '09. IEEE International Conference on, IEEE, Piscataway, NJ, USA, Jun. 14, 2009, pp. 1-5, XP031505927, ISBN: 978-1-4244-3435-0 paragraph [00II]—paragraph [0III].

Goyal: "Multiple Description Coding: Compression Meets the Network," In Signal Processing Magazine, IEEE, vol. 18., Issue 5 (Sep. 2001) pp. 74-93 URL:http://www.rle.mitedu/stir/documents/Goyal_SigProcMag2001_MD.pdf [Nov. 4, 2007].

Kountouris M et al., "Multiuser Diversity-Multiplexing Tradeoff in MIMO Broadcast Channels With Limited Feedback," 2006 ACSSC, pp. 364-368.

Taiwan Search Report—TW099127472—TIPO—Jul. 5, 2013.

Qualcomm Europe: " Multiple Description Coding for Spatial Feedback Payload Reduction", 3GPP Draft: R1-090866. 3rd Generation Partnership Project (3GPP), Mobile Competence Centre; 650, Route Des Lucioles; F-06921 Sophia-Anti Polis Cedex; France, no, Athens, Greece: Feb. 3, 2009, XP050318715, [Retrieved on Feb. 3, 2009] the whole document.

Yoo T. et al., "Multi-Antenna Downlink Channels with Limited Feedback and User Selection", IEEE Journal on Selected Areas in Communications, Sep. 2007, vol. 25, No. 7, pp. 1478-1491.

Boccardi F, et al., "Multiuser eigenmode transmission for MIMO broadcast channels with limited feedback", Signal Processing Advances in Wireless Communications, 2007-SPAWC 2007-IEEE 8TH Workshop on, IEEE, XX, Jun. 1, 2007, pp. 1-5, XP031189474, ISBN: 978-1-4244-0954-9.

Wang W, et al., "Limited feedback Zero Forcing precoding scheme for MIMO-broadcast channels", Personal, Indoor and Mobile Radio Communications, 2008. PIMRC 2008. IEEE 19TH International Symposium on, IEEE, Piscataway, NJ, USA, Sep. 15, 2008, pp. 1-5, XP031371295, ISBN: 978-1-4244-2643-0.

* cited by examiner

DL MU-MIMO OPERATION IN LTE-A

The present application claims priority to provisional U.S. Application Ser. No. 61/234,878, entitled "Downlink MU-MIMO operation in LTE-A," filed Aug. 18, 2009, assigned to the assignee hereof and incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may be within the coverage of multiple cells, where the term "cell" can refer to a coverage area of a base station and/or a base station subsystem serving the coverage area. One or more of the multiple cells may be selected to serve the UE. It may be desirable for the selected cell(s) to transmit data to the UE in a manner that can provide good performance.

SUMMARY

Techniques for scheduling UEs for data transmission in a wireless network are described herein. In one design, a scheduler (e.g., for a cell) may receive channel direction information (CDI) from a plurality of UEs and may also receive channel strength information (CSI) corresponding to the CDI from the plurality of UEs. In one design, the CDI from each UE may comprise at least one eigenvector (e.g., at least one right singular vector) for a wireless channel from the cell to the UE. In one design, the CSI from each UE may comprise at least one singular value corresponding to the at least one eigenvector from the UE. The scheduler may schedule at least one UE among the plurality of UEs for data transmission based on the CDI and CSI from the plurality of UEs. The scheduler may select the at least one UE based on a metric related to signal-to-leakage ratio (SLR), or spectral efficiency, or some other criterion, or a combination thereof.

In one design, the scheduler may evaluate the performance of different sets of UEs to determine whether to schedule one UE for single-user multiple-input multiple-output (SU-MIMO) or multiple UEs for multi-user MIMO (MU-MIMO) on a given time-frequency resource. The scheduler may determine the performance of each of the plurality of UEs for SU-MIMO. The scheduler may also determine the performance of each set of UEs for MU-MIMO. The scheduler may select either one UE for SU-MIMO or one set of UEs for MU-MIMO.

In one design, the scheduler may determine a precoding vector for each UE in each set of UEs based on the eigenvectors for all UEs in the set. The precoding vector for each UE may be defined to maximize the SLR for the UE. The scheduler may determine a metric for each set of UEs based on the precoding vectors for all UEs in the set. The metric may relate to spectral efficiency, or proportional fairness, or orthogonality between precoding vectors, or some other criterion, or a combination thereof. The scheduler may select a set of UEs for scheduling based on the metric for each set of UEs.

The scheduler may receive channel quality information (CQI) from the at least one UE selected for scheduling. The scheduler may select at least one modulation and coding scheme (MCS) for the at least one UE based on the CQI. The scheduler may send data transmission to the at least one UE based on the at least one MCS.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
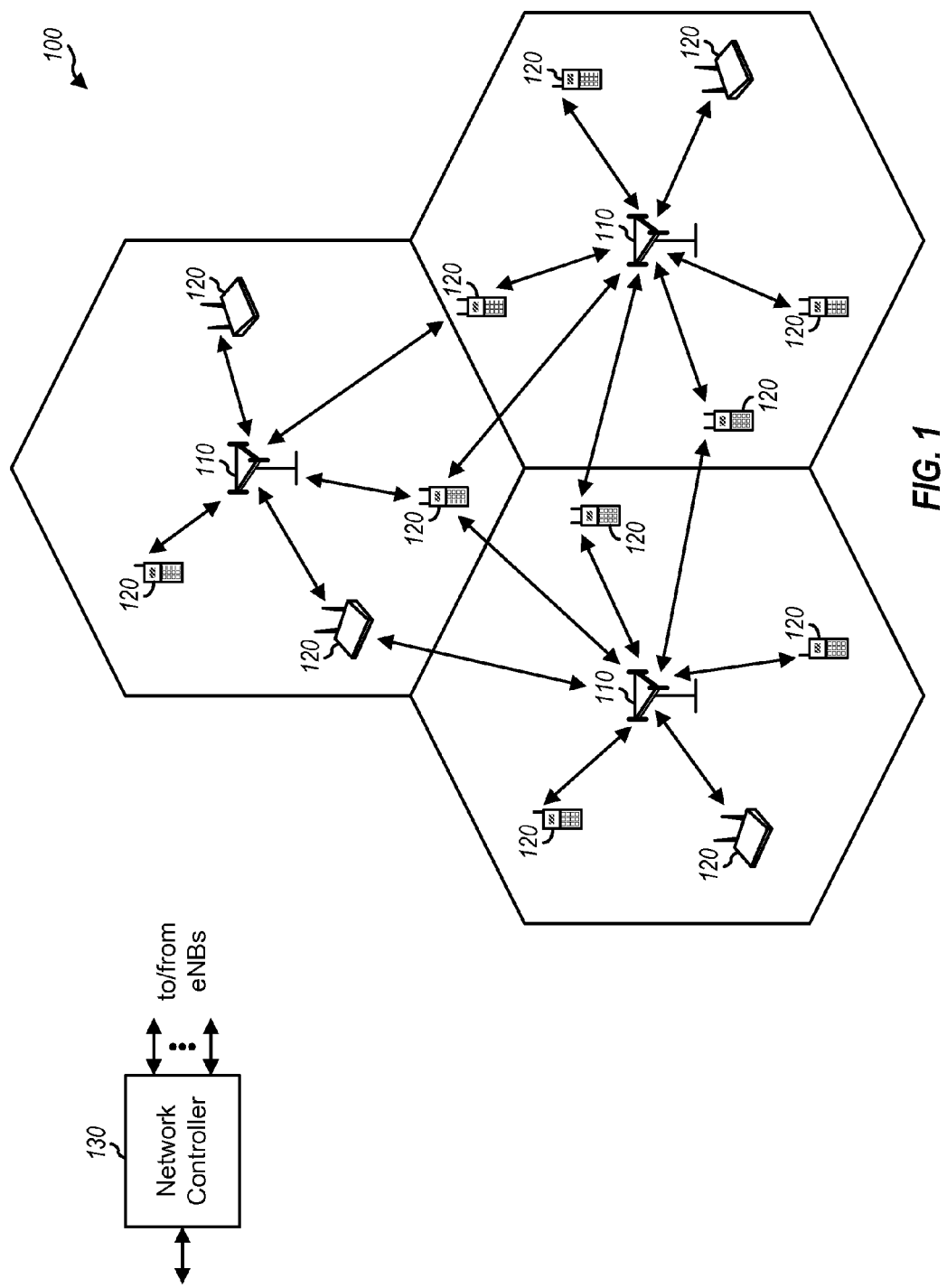
FIG. 1 shows a wireless communication network.

FIG. 1 shows a wireless communication network 100, which may be an LTE network or some other wireless network. Network 100 may include a number of evolved Node Bs (eNBs) 110 and other network entities that can support communication for a number of UEs. An eNB may be an entity that communicates with the UEs and may also be referred to as a base station, a Node B, an access point, etc. Each eNB 110 may provide communication coverage for a particular geographic area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, an eNB may support one or multiple (e.g., three) cells.

A network controller 130 may couple to a set of eNBs and may provide coordination and control for these eNBs. Network controller 130 may comprise a Mobile Management Entity (MME) and/or some other network entity.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB/cell via the downlink and uplink. The downlink (or forward link) refers to the communication link from the eNB/cell to the UE, and the uplink (or reverse link) refers to the communication link from the UE to the eNB/cell.

Table 1 lists a set of transmission modes/schemes that may be supported. Each cell may support SU-MIMO and MU-MIMO for its UEs. Multiple cells may support CoMP for one or more UEs, which may be located at the boundary of these cells and may be referred to as cell-edge UEs. The cell-edge UEs may observe high inter-cell interference, which may adversely impact performance. CoMP can exploit spatial dimension to improve the performance of the cell-edge UEs.

TABLE 1

| Mode | | Description |
|---|---|---|
| Multi-user MIMO | MU-MIMO | A cell sends data transmission to multiple UEs on the same time-frequency resource, e.g., with beamsteering. |
| Single-user MIMO | SU-MIMO | A cell sends data transmission to a single UE on a given time-frequency resource. |
| Coordinated multi-point | CoMP | Multiple cells send data transmission to one or more UEs on a given time-frequency resource. |

Beamsteering may be used for each of the transmission modes listed in Table 1. Beamsteering is a process to control the spatial direction of a transmission toward a target receiver and/or away from an unintended receiver. Beamsteering may be performed by applying a precoding vector to the transmission at a transmitter, as described below.

Figure 2:
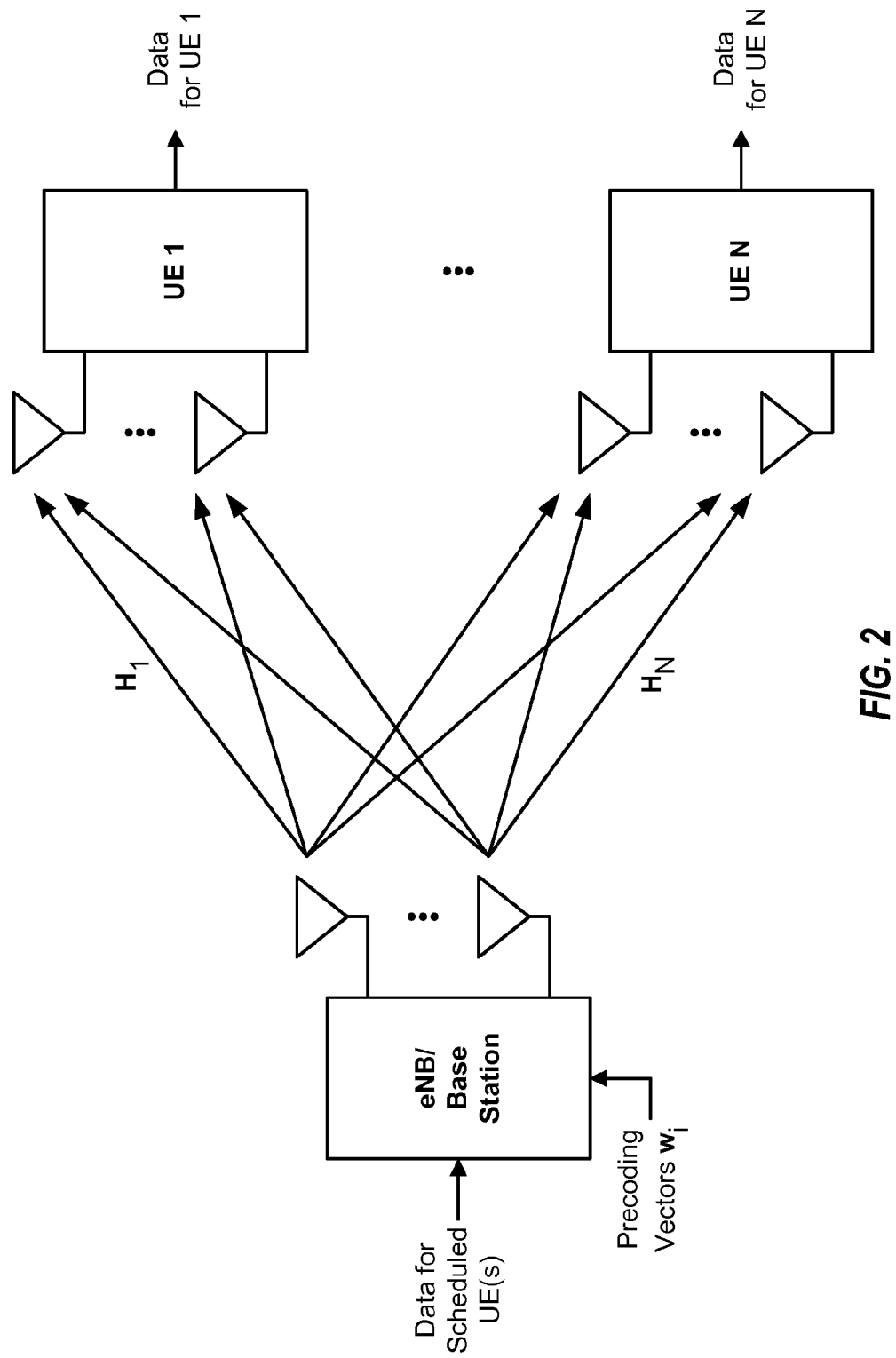
FIG. 2 shows downlink transmission from a cell to one or more UEs.

FIG. 2 shows data transmission from one cell to one or more UEs on a given time-frequency resource. The cell may be equipped with multiple (T) antennas. For SU-MIMO, the cell may send data transmission to one UE equipped with multiple antennas. For MU-MIMO, the cell may send data transmission to multiple UEs, and each UE may be equipped with one or more antennas. For simplicity, the following description assumes that each UE is equipped with multiple (R) antennas.

As shown in FIG. 2, the response of the wireless channel from the cell to each UE i may be given by an R×T channel matrix $H_i$. The channel matrix $H_i$ includes channel gains that represent the short-term fading between the T transmit antennas at the cell and the R receive antennas at UE i.

In one design, each UE may report one or more eigenvectors for one or more eigenmodes of the wireless channel from the cell to that UE. Each UE may perform singular value decomposition of its channel matrix as follows:

$$H_i = U_i \Sigma_i V_i^H, \quad \text{Eq (1)}$$

where $U_i$ is a unitary matrix of left singular vectors of $H_i$,
$V_i$ is a unitary matrix of right singular vectors of $H_i$,
$\Sigma_i$ is a diagonal matrix of singular values of $H_i$, and
"H" denotes a Hermetian or conjugate transpose.

A unitary matrix has columns that are orthogonal to one another, and each column has unit power. A diagonal matrix has possible non-zero values along the diagonal and zeros elsewhere. Matrix $V_i$ may also be referred to as a transmit matrix and may be used to precode data prior to transmission. Transmit matrix $V_i$ may also be obtained by performing eigenvalue decomposition of a covariance matrix of $H_i$. The eigenvalue decomposition may be expressed as $H_i^H H_i = V_i \Lambda_i V_i^H$, where $\Lambda_i$ is a diagonal matrix of eigenvalues of $H_i^H H_i$, and $V_i$ is a matrix of eigenvectors of $H_i^H H_i$. The eigenvectors of $H_i^H H_i$ may thus correspond to the right singular vectors of $H_i$.

The cell may perform precoding with the transmit matrix $V_i$ (or possibly a subset of its columns) in order to transmit data on the eigenmodes of $H_i$ to UE i. The eigenmodes may be viewed as orthogonal spatial channels and may also be referred to as layers. The singular values in $\Sigma_i$ are indicative of the channel strengths of the eigenmodes of $H_i$. Good performance may be achieved by transmitting data on the eigenmodes of $H_i$.

UE i may select M best eigenvectors in $V_i$ corresponding to M largest singular values in $\Sigma_i$, where in general $1 \leq M \leq \min\{R, T\}$. In one design, UE i may evaluate the performance of different possible number of eigenvectors (i.e., different possible M values) and may select the M value with the best performance. In another design, UE i may be configured with a specific value of M based on various criteria such as long-term channel conditions, the amount of data for UE i, etc. In any case, M may denote the highest rank configured for UE i and may be equal to one (e.g., for MU-MIMO), or two (e.g., for SU-MIMO), or some other value.

UE i may quantize each of the M best eigenvectors in $V_i$ to obtain a corresponding quantized eigenvector. A codebook may be used to quantize each eigenvector and may include a number of vectors. Each vector in the codebook may be assigned a unique index. UE i may evaluate each eigenvector against each vector in the codebook, e.g., based on a metric such as normalized correlation. For each eigenvector, the vector in the codebook with the best metric may be selected as the quantized eigenvector for that eigenvector. UE i may report M quantized eigenvectors and M corresponding singular values.

The cell may receive quantized eigenvectors from a number of UEs. The cell may perform scheduling to select one or more UEs for data transmission on a given time-frequency resource. For SU-MIMO, the cell may transmit multiple packets on multiple eigenmodes/layers based on multiple quantized eigenvectors from one UE, e.g., one packet on each layer. A packet may also be referred to as a transport block, a codeword, etc. For MU-MIMO, the cell may transmit multiple packets based on multiple quantized eigenvectors from multiple UEs. For scheduling, the cell may determine (i) the performance of different UEs that can be scheduled with SU-MIMO and (ii) the performance of different sets of UEs that can be scheduled with MU-MIMO. The cell may select either SU-MIMO or MU-MIMO based on the performance of different UEs and different sets of UEs. If SU-MIMO is selected, then the cell may schedule the UE with the best performance. If MU-MIMO is selected, then the cell may schedule the set of UEs with the best performance.

In one design, for MU-MIMO, different sets of UEs may be evaluated based on a metric related to SLR. SLR may provide a good balance between maximizing received signal quality at a target UE for data transmission and minimizing interference to victim UEs. In general, a set of UEs may include any number of UEs, and each UE may be scheduled for transmission of any number of packets on any number of layers. For simplicity, the description below assumes that one packet is sent on one layer to each UE in a set of UEs being evaluated.

The SLR of UE i may be expressed as:

$$SLR_i = \frac{\lambda_i^2 |v_i^H w_i|^2}{\mu + \sum_{j \neq i} \lambda_j^2 |v_j^H w_i|^2}, \quad \text{Eq (2)}$$

where $v_i$ is a quantized eigenvector from UE i,
$w_i$ is a precoding vector for UE i,
$\lambda_i$ is a singular value corresponding to the quantized eigenvector $v_i$,
$v_j$ and $\lambda_j$ are a quantized eigenvector and a singular value from UE j, which is also scheduled with UE i,
$\mu$ denotes interference from other cells and thermal noise, and
$SLR_i$ is the SLR of UE i.

Equation (2) assumes that the receiver processing at each UE is matched to the left singular vector $u_i$ (corresponding to the right singular vector $v_i$) for that UE. The cell performs precoding with the precoding vector $w_i$ for data transmission to UE i. This data transmission is a desired transmission at target UE i and is also an interfering transmission at each UE also scheduled with UE i. In equation (2), the numerator includes the desired signal power at target UE i. The denominator includes (i) the interfering signal power at all co-scheduled UE(s), which is given by the summation term, and (ii) other interference and noise.

The precoding vector $w_i$ that maximizes the SLR of UE i may be expressed as:

$$w_i = \left(\mu I + \sum_{j \neq i} \lambda_j^2 |v_j v_j^H|^2\right)^{-1} v_i, \quad \text{Eq (3)}$$

where I denotes the identity matrix.

As shown in equation (3), the precoding vector $w_i$ for UE i may be computed based on the quantized eigenvectors for all UEs being scheduled and the singular values of the co-scheduled UE(s). A precoding vector $w_j$ for each co-scheduled UE j may also be computed in similar manner.

If each UE performs receiver processing based on its dominate eigenvector, then a signal-to-noise-and-interference ratio (SINR) of UE i may be expressed as:

$$SINR_i = \frac{\lambda_i^2 |v_i^H w_i|^2}{\mu + \sum_{j \neq i} \lambda_i^2 |v_i^H w_j|^2}, \quad \text{Eq (4)}$$

where SINR is the SINR of UE i.

In equation (4), the numerator includes the desired signal power at UE i due to the data transmission sent to UE i using the precoding vector $w_i$. The denominator includes (i) the interfering signal power at UE i due to data transmission(s) sent to co-scheduled UE(s) using the precoding vector(s) $w_j$ and (ii) other interference and noise.

If each UE performs receiver processing based on a minimum mean square error (MMSE) receiver, then the SINR of UE i may be expressed as:

$$SINR_i = w_i^H H_i^H \left(R_{nn} + \sum_{j \neq i} w_j^H H_i^H H_i w_j\right)^{-1} H_i w_i, \quad \text{Eq (5)}$$

where $R_{nn}$ is a covariance matrix of interference from other cells and thermal noise. In equation (5), the covariance matrix $R_{nn}$ may be approximated as $R_{nn} = \mu I$ if the interference is unknown at the cell.

The performance of a set of UEs may be quantified by a metric, which may relate to spectral efficiency or some other parameter. In one design, the SINR of each UE may be mapped to spectral efficiency based on an unconstrained capacity function, as follows:

$$SE_i = \log_2(1 + SINR_i), \quad \text{Eq (6)}$$

where $SE_i$ is the spectral efficiency of UE i. The SINR of UE i may also be mapped to spectral efficiency based on other functions.

In one design, one or more UEs may be scheduled on a given time-frequency resource based on a performance metric related to overall spectral efficiency. The overall spectral efficiency, $SE_{total}$, for a set of UEs may be expressed as:

$$SE_{total} = \sum_i SE_i. \quad \text{Eq (7)}$$

In another design, one or more UEs may be scheduled on a given time-frequency resource based on a performance metric related to proportional fairness. A proportional fairness metric, U, for a set of UEs may be expressed as:

$$U = \sum_i \frac{SE_i}{TP_i}, \quad \text{Eq (8)}$$

where $TP_i$ is the throughput experienced by UE i. Fairness may be incorporated into scheduling by considering past performance (e.g., throughput) of each UE.

In yet another design, one or more UEs may be scheduled on a given time-frequency resource based on a performance metric related to orthogonality between the precoding vectors. The orthogonality between two precoding vectors for two UEs may be expressed as:

$$Q_{ij} = |w_i^H w_j|, \quad \text{Eq (9)}$$

where $Q_{ij}$ is the orthogonality between the precoding vectors for UEs i and j.

The orthogonality between precoding vectors may be computed for each set of UEs. The set of UEs (e.g., the pair of UEs) with the most orthogonal precoding vectors may be selected. This design may avoid computation of spectral efficiency for each set of UEs. Other performance metrics may also be used to select a set of UEs for scheduling.

A combination of the above designs may also be used to select a set of UEs for scheduling. For example, L best sets of UEs with the most orthogonal precoding vectors may be initially selected. A performance metric (e.g., for total spectral efficiency or proportional fairness) may then be computed for each of the L sets of UEs. The set of UEs with the best performance metric may then be selected for scheduling.

Other performance metrics may also be defined for a set of UEs. Regardless of the performance metric selected for use, the cell may compute the performance metric for different sets of UEs. Each set may include either (i) one UE being considered for SU-MIMO or (ii) multiple UEs being considered for MU-MIMO. The set of UEs with the best performance metric may be selected and scheduled for data transmission on the time-frequency resource by the cell.

In general, one or more packets may be sent to each UE in the set of UEs scheduled for data transmission. Each packet may be processed (e.g., encoded and modulated) based on a suitable MCS to obtain a corresponding codeword. In one design, each codeword may be transmitted with one precoding vector. In other designs, a codeword may be transmitted with more than one precoding vector, or multiple codewords may be transmitted with one precoding vector. For simplicity, the description below assumes each codeword is transmitted with one precoding vector.

In one design, the MCS for each codeword may be determined based on the spectral efficiency corresponding to the precoding vector used for the codeword, as described above. In another design, a precoded reference signal may be used to aid MCS selection. The cell may schedule one or more UEs for data transmission and may determine K precoding vectors for the scheduled UE(s), as described above. The cell may then generate K precoded reference signals based on the K precoding vectors and may transmit the precoded reference signals to the scheduled UE(s). Each scheduled UE may estimate the SINR of each codeword for which the UE is scheduled based on the precoded reference signal for that codeword. Each scheduled UE may determine CQI based on the SINR of each codeword for that UE and may send the CQI to the cell. The cell may then select the MCS for each codeword based on the reported CQI for the codeword.

Scheduling of a set of UEs in a given time-frequency resource has been described above. This time-frequency resource may cover any unit of frequency and any unit of time. Different sets of UEs may be scheduled on different time-frequency resources in similar manner. In one design, frequency selective scheduling may be performed to schedule and multiplex different sets of UEs across frequency, e.g., on different subbands. Each subband may cover a range of frequencies, which may correspond to 1.08 MHz in LTE. To support frequency selective scheduling, a UE may determine and report CDI and/or CQI for one or more subbands on which the UE can be scheduled.

In general, a UE may send channel direction information (CDI) and channel strength information (CSI) used by one or more cells to transmit data to the UE. The CDI may be indicative of one or more spatial directions or beams in which to transmit data to the UE. In one design, the CDI may comprise one or more eigenvectors, which may be obtained by singular value decomposition or eigenvalue decomposition of a channel matrix, as described above. The CDI may also comprise other information. The CSI may be indicative of the channel strength associated with the one or more layers or spatial directions conveyed by the CDI. In one design, the CSI may comprise one or more singular values, which may be obtained by singular value decomposition or eigenvalue decomposition of a channel matrix, as described above.

The UEs may send CDI (e.g., eigenvectors) and CSI (e.g., singular values) with sufficient accuracy in order to obtain good performance for SU-MIMO, MU-MIMO, and CoMP (e.g., good transmit nulling for MU-MIMO and CoMP). Computer simulations indicate that the performance of SU-MIMO and MU-MIMO is dependent on the number of quantization bits for CDI. For example, the cell spectral efficiency for MU-MIMO may be reduced by about 20% when an eigenvector is quantized to 6 bits, or about 8% when an eigenvector is quantized to 12 bits, or by a negligible amount when an eigenvector is quantized to 20 bits versus the case of no quantization error. In general, performance loss (e.g., in terms of cell spectral efficiency and UE spectral efficiency) may be reduced by using more bits for CDI.

In one design, an eigenvector may be quantized to a fixed number of bits (e.g., 6, 8, 10, 12, or some other number of bits). In another design, an eigenvector may be quantized to a configurable number of bits. A UE may be configured for a particular number of quantization bits based on various factors. In one design, an eigenvector may be quantized with fewer bits (e.g., 4, 6, or more bits) for SU-MIMO or with more bits (e.g., 8, 10, 12, or more bits) for MU-MIMO.

Various feedback reduction techniques may be used to reduce the amount of overhead needed to send CDI with sufficient accuracy. These feedback reduction techniques may include feedback compression and feedback encoding techniques. For feedback compression, only significant information about a wireless channel (e.g., one or more eigenvectors) may be reported rather than an entire channel matrix. Computer simulations indicate that feedback of eigenvectors by the UEs may result in negligible loss of performance (e.g., less than few percent loss of throughput) over feedback of channel matrices in most scenarios.

For feedback encoding, techniques such as multiple description coding (MDC) may be used to exploit frequency-time correlation of a wireless channel. For MDC, a UE may quantize a dominant eigenvector with different codebooks in different reporting periods. Each codebook may include a different set of vectors. Different codebooks may be selected in different reporting periods to quantize the dominant eigenvector obtained in these reporting periods. For example, the UE may quantize the dominant eigenvector at time T1 with a first codebook, quantize the dominant eigenvector at time T2 with a second codebook, etc. The use of different codebooks may improve channel feedback accuracy.

In general, quantization of CDI, CSI and CQI may be performed based on a tradeoff between performance and overhead. This may be especially the case when reporting CDI, CSI and CQI for multiple subbands to support frequency selective scheduling.

In one design, a UE may report CDI based on a configurable rate. The UE may send (i) short-term CDI at a faster rate (e.g., every 5 milliseconds (ms)) in scenarios with large antenna separation and low antenna correlation or (ii) long-term CDI at a slower rate (e.g., every 200 ms) in scenarios with low antenna spacing and/or high antenna correlation. In general, the rate of CDI reporting may be dependent on various factors such as UE antenna configuration, channel conditions, data requirements, overhead considerations, etc. Any number of CDI reporting rates may be supported. A CDI reporting rate may be selected for the UE at the start of a communication session based on suitable factors. The CDI reporting rate may change during the communication session, e.g., due to changes in any of the factors used for selecting the CDI reporting rate. A cell may also obtain reliable long-term CDI by filtering short-term CDI reports from the UE.

In one design, a UE may report different types of channel information at the same rate. For example, the UE may send CDI, CSI and CQI in each report. In another design, a UE may report different types of channel information at different rates in order to reduce overhead. The UE may report CQI and CSI at a first rate and may report CDI at a second rate, which may or may not match the first rate. In one design, the UE may report CQI and CSI at a faster rate (e.g., every 5 ms) and may report CDI at a faster rate or a slower rate. The UE may thus report short-term CQI and CSI at the faster rate even when reporting long-term CDI at the slower rate. This may reduce performance loss due to long-term CQI reporting. Computer simulations indicate that reporting long-term CQI results in performance loss of about 20% in cell spectral efficiency and about 30% in cell-edge UE spectral efficiency as compared to reporting short-term CQI.

A UE may determine CQI based on a reference signal from a cell and may send the CQI to the cell. The UE and one or more other UEs may be scheduled for MU-MIMO or CoMP. The UE may not be able to capture the potential impact of multi-user interference in the CQI reported to the cell.

In one design, a scheduler may perform CQI and rank prediction and MCS selection based on channel information received from the UEs. A UE may report CDI (e.g., for one or more eigenvectors) and CQI (e.g., for each reported eigenvector). The CQI may capture the interference level and the singular values of the wireless channel. The scheduler may select a set of UEs for scheduling, as described above, and may estimate the achievable spectral efficiency for each scheduled UE based on the reported CQI and the computed transmit vectors.

In one design, link adaptation may be performed to account for errors (e.g., due to multi-user interference) in the CQI reported by the UEs. In one design, an outer loop may be maintained for each UE to adjust a back-off factor for that UE. The back-off factor may account for errors in the reported CQI and may be adjusted by the outer loop. In another design, a back-off factor may be computed based on orthogonality between the precoding vectors computed for all UEs in a set of UEs being scheduled together. For example, a progressively smaller back-off factor may be used for progressively more orthogonal precoding vectors, and vice versa. For both designs, the spectral efficiency of a UE may be determined as described above and may be reduced by the back-off factor for the UE. An MCS may then be selected for the UE based on the reduced spectral efficiency.

In one design, asynchronous hybrid automatic retransmission (HARQ) may be used to improve performance. For asynchronous HARQ, a cell may send a transmission of a packet to a UE. If the packet is decoded in error, then the cell may send another transmission of the packet to the UE in a subframe in which better CQI is reported by the UE. Asynchronous HARQ may enable the cell to capture multi-user diversity gains in the wireless network.

A cell may schedule a set of UEs on a given time-frequency resource. The cell may compute one or more precoding vectors for each scheduled UE, e.g., based on the SLR criterion and without using a codebook, as described above. The cell may precode the data for each scheduled UE based on the precoding vector(s) selected for that UE. The cell may also transmit a demodulation reference signal (DMRS) for each scheduled UE based on the precoding vector(s) for that UE. The DMRS may be UE-specific and may be precoded with the same precoding vector(s) used for data transmission on one or more layers. If multiple UEs are scheduled on the time-frequency resource, then the DMRS for different UEs may be multiplexed with code division multiplexing (CDM), or time division multiplexing (TDM), or frequency division multiplexing (FDM).

The techniques described herein for sending channel information comprising one or more eigenvectors (or CDI), one or more corresponding singular values (or CSI), and one or more CQI values may provide various advantages. First, the techniques may provide a unified feedback scheme that allows for seamless switching between different transmission modes such as SU-MIMO, MU-MIMO, and CoMP. The switching may be transparent to the UEs. Second, for MU-MIMO and CoMP, information from multiple UEs may be used to determine one or more precoding vectors for each scheduled UE and to determine an MCS for each packet to transmit to each scheduled UE.

Figure 3:
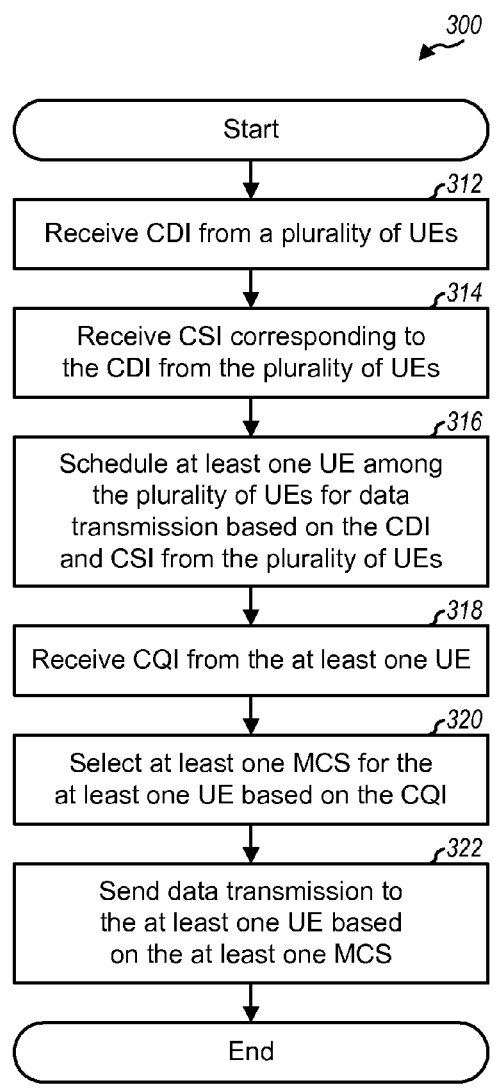
FIG. 3 shows a process for scheduling UEs for data transmission.

FIG. 3 shows a design of a process 300 for scheduling UEs in a wireless network. Process 300 may be performed by a scheduler (as described below) or by some other network entity. The scheduler may reside at a cell or some other network entity (e.g., network controller 130 in FIG. 1). The scheduler may receive CDI from a plurality of UEs (block 312). The scheduler may also receive CSI corresponding to the CDI from the plurality of UEs (block 314). The scheduler may schedule at least one UE among the plurality of UEs for data transmission based on the CDI and CSI from the plurality of UEs (block 316). The scheduler may select the at least one UE for scheduling based on a metric related to SLR, or spectral efficiency, or some other criterion, or a combination thereof.

In one design, the CDI from each UE may comprise at least one eigenvector (e.g., at least one right singular vector) for a wireless channel from the cell to that UE. In one design, the CSI from each UE may comprise at least one singular value corresponding to the at least one eigenvector. In one design, the scheduler may receive the CDI and CSI at the same rate. In another design, the scheduler may receive the CDI and CSI at different rates. For example, a UE may report the CSI at a faster rate than the CDI.

In one design, the scheduler may evaluate the performance of different sets of UEs to determine whether to schedule one UE for SU-MIMO or multiple UEs for MU-MIMO. The scheduler may determine the performance of each of the plurality of UEs for SU-MIMO. The scheduler may also determine the performance of each of at least one set of UEs for MU-MIMO. The at least one set of UEs may be formed based on the plurality of UEs. The scheduler may select (i) one UE among the plurality of UEs for scheduling with SU-MIMO or (ii) one set of UEs among the at least one set of UEs for scheduling with MU-MIMO.

In one design, the scheduler may determine a plurality of set of UEs based on the plurality of UEs. The scheduler may determine a precoding vector for each UE in each set of UEs based on the eigenvectors for all UEs in the set of UEs. In one design, the scheduler may determine the precoding vector for each UE to maximize an SLR for the UE, e.g., as shown in equation (2). The scheduler may determine a metric for each set of UEs based on the precoding vectors for all UEs in the set of UEs. The scheduler may then select a set of UEs for scheduling based on the metric for each set of UEs.

In one design, the scheduler may determine the spectral efficiency for each UE in each set of UEs based on the precoding vectors for all UEs in the set of UEs. The scheduler may determine the metric for each set of UEs based on the spectral efficiencies for all UEs in the set of UEs, e.g., as shown in equation (7). The metric may also be determined based further on the throughput experienced by each UE in the set of UEs, e.g., as shown in equation (8). In another design, the scheduler may determine the metric for each set of UEs based on orthogonality between the precoding vectors for all UEs in the set of UEs. In general, the metric for each set of UEs may relate to spectral efficiency, or proportional fairness, or orthogonality between precoding vectors, or some other criteria, or a combination thereof.

In one design, the scheduler may receive noise and interference information from the plurality of UEs. This information may be indicative of noise and interference observed by a UE and may comprise a noise covariance matrix. The scheduler may schedule the at least one UE for data transmission based further on the noise and interference information from the plurality of UEs. For example, the scheduler may determine the SINR of each UE based on the noise covariance matrix $R_{nn}$ from that UE, e.g., as shown in equation (5).

The scheduler may receive CQI from the at least one UE (block 318). The scheduler may select at least one MCS for the at least one UE based on the CQI from the at least one UE (block 320). In one design, the scheduler may determine at least one backoff-factor for the at least one UE, e.g., based on any of the designs described above. The scheduler may select the at least one MCS based further on the at least one backoff-factor. The scheduler may send data transmission to the at least one UE based on the at least one MCS (block 322).

Figure 4:
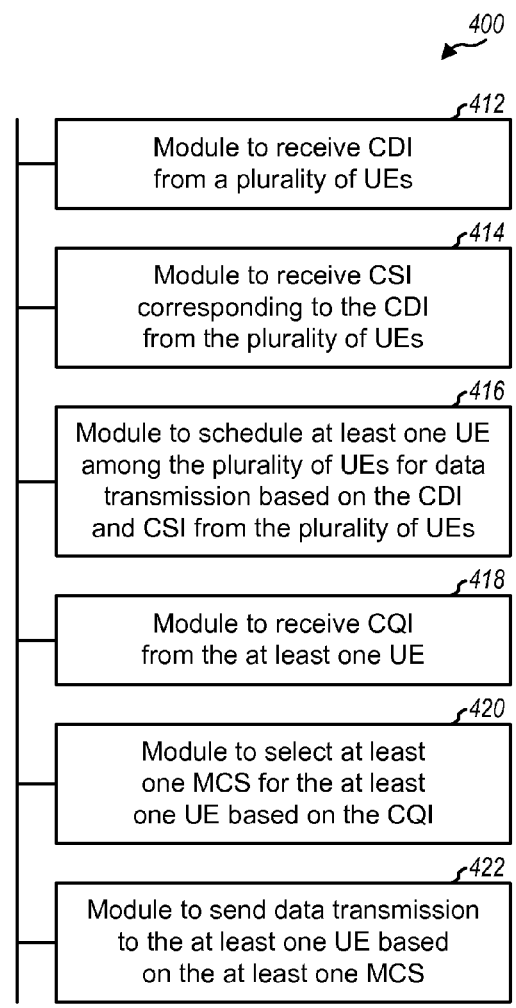
FIG. 4 shows an apparatus for scheduling UEs for data transmission.

FIG. 4 shows a design of an apparatus 400 for scheduling UEs. Apparatus 400 includes a module 412 to receive CDI from a plurality of UEs, a module 414 to receive CSI corresponding to the CDI from the plurality of UEs, a module 416 to schedule at least one UE among the plurality of UEs for data transmission based on the CDI and CSI from the plurality of UEs, a module 418 to receive CQI from the at least one UE, a module 420 to select at least one MCS for the at least one UE based on the CQI, and a module 422 to send data transmission to the at least one UE based on the at least one MCS.

Figures 5, 6:
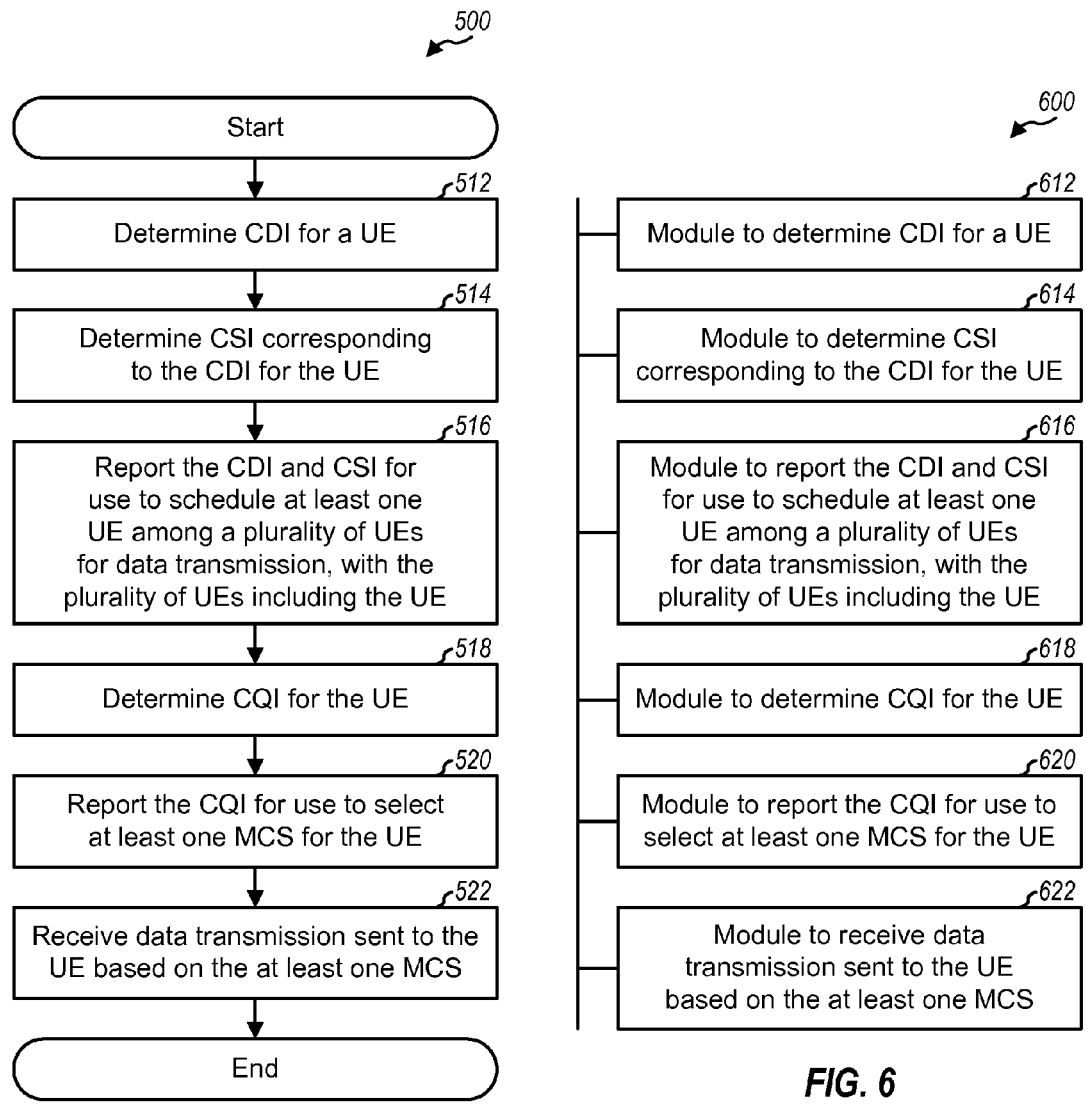
FIG. 5 shows a process for receiving data transmission.
FIG. 6 shows an apparatus for receiving data transmission.

FIG. 5 shows a design of a process 500 for receiving data. Process 500 may be performed by a UE (as described below) or by some other entity. The UE may determine CDI for the UE (block 512). The UE may also determine CSI corresponding to the CDI (block 514). The UE may report the CDI and CSI for use to schedule at least one UE among a plurality of UEs for data transmission, with the plurality of UEs including the UE (block 516).

In one design, the UE may determine a channel matrix for a wireless channel from a cell to the UE. The UE may decompose the channel matrix to obtain a plurality of eigenvectors (e.g., a plurality of right singular vectors), as shown in equation (1). The UE may provide at least one eigenvector among the plurality of eigenvectors as the CDI for the UE. In one design, the UE may select a single eigenvector associated with the largest singular value if the UE is configured for MU-MIMO. In one design, the UE may select at least two eigenvectors associated with at least two largest singular values if the UE is configured for SU-MIMO. In general, the UE may report any number of eigenvectors and may report the same or different numbers of eigenvectors for SU-MIMO and MU-MIMO. The CSI may include at least one largest singular value corresponding to the at least one eigenvector provided as the CDI for the UE.

In one design, the UE may report the CDI and CSI at the same rate. In another design, the UE may report the CDI and CSI at different rates. For example, the UE may report the CDI at a slower rate than the CSI.

The UE may quantize the at least one eigenvector in various manners. In one design, the UE may quantize each eigenvector with a fixed number of bits. In another design, the UE may quantize each eigenvector with a configurable number of bits. In one design, the UE may quantize each eigenvector with the same number of bits regardless of whether the UE is configured for SU-MIMO or MU-MIMO. In another design, the UE may quantize each eigenvector with (i) a first number of bits if the UE is configured for SU-MIMO or (ii) a second number of bits greater than the first number of bits if the UE is configured for MU-MIMO. In one design, the UE may quantize eigenvector(s) based on the same codebook in each reporting period. In another design, the UE may quantize eigenvector(s) based on different codebooks in different reporting periods with MDC.

In one design, the UE may determine noise and interference information for the UE, which may comprise a noise covariance matrix $R_{nn}$, or a noise variance $\mu$, or some other information. The UE may report the noise and interference information for use for scheduling.

In one design, the UE may determine CQI (block 518) and may report the CQI for use to select at least one MCS for the UE (block 520). The UE may receive data transmission sent to the UE based on the at least one MCS (block 522). The UE may receive data transmission sent to only the UE if the UE is scheduled for SU-MIMO. The UE may receive data transmission sent to multiple UEs including the UE if the UE is scheduled for MU-MIMO.

FIG. 6 shows a design of an apparatus 600 for receiving data. Apparatus 600 includes a module 612 to determine CDI for a UE, a module 614 to determine CSI corresponding to the CDI for the UE, a module 616 to report the CDI and CSI for use to schedule at least one UE among a plurality of UEs for data transmission, with the plurality of UEs including the UE, a module 618 to determine CQI for the UE, a module 620 to report the CQI for use to select at least one MCS for the UE, and a module 622 to receive data transmission sent to the UE based on the at least one MCS.

The modules in FIGS. 4 and 6 may comprise processors, electronic devices, hardware devices, electronic components, logical circuits, memories, software codes, firmware codes, etc., or any combination thereof.

Figure 7:
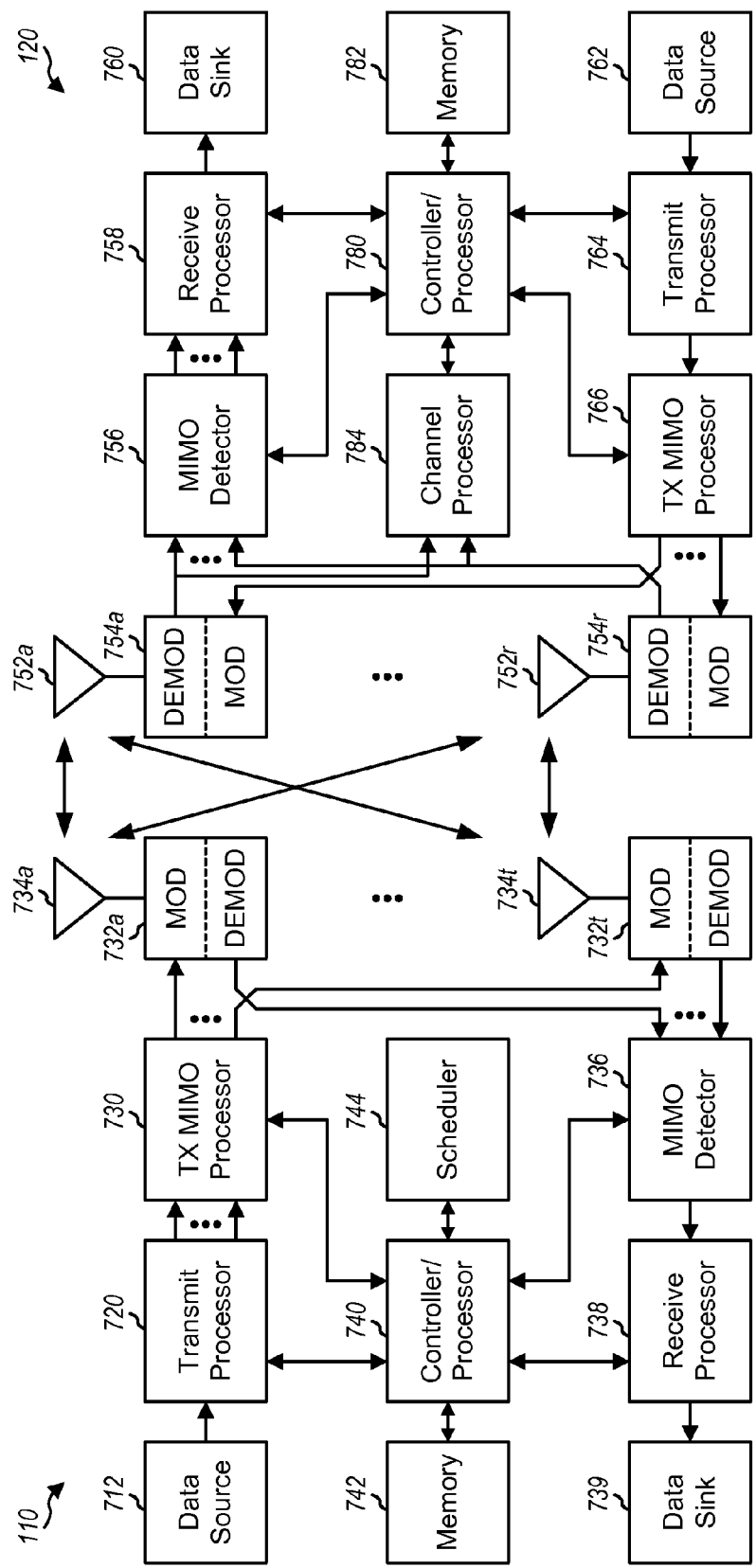
FIG. 7 shows a block diagram of a base station and a UE.

FIG. 7 shows a block diagram of a design of a base station/eNB 110 and a UE 120, which may be one of the base stations/eNBs and one of the UEs in FIG. 1. Base station 110 may serve one or more cells and may be equipped with T antennas 734a through 734t, where T>1. UE 120 may be equipped with R antennas 752a through 752r, where R≥1.

At base station 110, a transmit processor 720 may receive data for one or more UEs from a data source 712, process the data for each UE based on at least one MCS selected for that UE, and provide data symbols for all UEs. Processor 720 may also receive and process control information from a controller/processor 740 and provide control symbols. Processor 720 may also generate reference symbols for one or more reference signals. A transmit (TX) MIMO processor 730 may perform precoding on the data symbols, the control symbols, and/or the reference symbols for each UE based on one or more precoding vectors determined for that UE. Processor 730 may provide T output symbol streams to T modulators (MODs) 732a through 732t. Each modulator 732 may process a respective output symbol stream (e.g., for OFDM, etc.) to obtain an output sample stream. Each modulator 732 may further process (e.g., convert to analog, amplify, filter, and upconvert) the output sample stream to obtain a downlink signal. T downlink signals from modulators 732a through 732t may be transmitted via T antennas 734a through 734t, respectively.

At UE 120, antennas 752a through 752r may receive the downlink signals from base station 110 and other base stations and may provide received signals to demodulators (DEMODs) 754a through 754r, respectively. Each demodulator 754 may condition (e.g., filter, amplify, downconvert, and digitize) a respective received signal to obtain input samples. Each demodulator 754 may further process the input samples (e.g., for OFDM, etc.) to obtain received symbols. A MIMO detector 756 may obtain received symbols from all R demodulators 754a through 754r, perform MIMO detection on the received symbols, and provide detected symbols. A receive processor 758 may process (e.g., demodulate and decode) the detected symbols, provide decoded data for UE 120 to a data sink 760, and provide decoded control information to a controller/processor 780.

On the uplink, at UE 120, a transmit processor 764 may receive data from a data source 762 and control information (e.g., CDI, CSI, CQI, etc.) from controller/processor 780. Processor 764 may process (e.g., encode and modulate) the data and control information to obtain data symbols and control symbols, respectively. Processor 764 may also generate reference symbols for one or more reference signals. The symbols from transmit processor 764 may be precoded by a TX MIMO processor 766 if applicable, further processed by modulators 754a through 754r (e.g., for SC-FDM, OFDM, etc.), and transmitted to base station 110 and possibly other base stations. At base station 110, the uplink signals from UE 120 and other UEs may be received by antennas 734, processed by demodulators 732, detected by a MIMO detector 736, and further processed by a receive processor 738 to obtain decoded data and control information sent by UE 120 and other UEs. Processor 738 may provide the decoded data to a data sink 739 and the decoded control information to controller/processor 740.

A channel processor 784 at UE 120 may estimate the channel response for each cell of interest and may provide a channel matrix for the cell. Processor 780 and/or 784 may determine channel information such as CDI, CSI, CQI, etc. based on the channel matrix for each cell of interest, as described above.

Controllers/processors 740 and 780 may direct the operation at base station 110 and UE 120, respectively. Memories 742 and 782 may store data and program codes for base station 110 and UE 120, respectively. A scheduler 744 may schedule UEs for data transmission on the downlink and/or uplink. Scheduler 744 and/or other processors and modules at base station 110 may perform or direct process 300 in FIG. 3 and/or other processes for the techniques described herein. Process 300 may also be performed by one or more processors within network controller 130. Processor 780 and/or other processors and modules at UE 120 may perform or direct process 500 in FIG. 5 and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving channel direction information (CDI) from a plurality of user equipments (UEs), wherein the receiving CDI from the plurality of UEs comprises receiving at least one eigenvector from each of the plurality of UEs;
receiving channel strength information (CSI) corresponding to the CDI from the plurality of UEs, wherein the CSI is received more frequently than the CDI from a UE among the plurality of UEs; and
scheduling at least one UE among the plurality of UEs for data transmission based on at least one of the CDI and the CSI from the plurality of UEs, wherein the scheduling the at least one UE comprises:
  determining a plurality of sets of UEs based on the plurality of UEs;
  determining a precoding vector for each UE in each set of UEs based on eigenvectors for all UEs in the set of UEs;
  determining a metric for each set of UEs based on precoding vectors for all UEs in the set of UEs, wherein the determining the metric for each set of UEs comprises
    determining a spectral efficiency for each UE in each set of UEs based on the precoding vectors for all UEs in the set of UEs, and
    determining the metric for each set of UEs based on spectral efficiencies for all UEs in the set of UEs; and
  selecting a set of UEs for scheduling based on the metric for each set of UEs.

2. The method of claim 1, wherein the receiving CSI from the plurality of UEs comprises receiving at least one singular value corresponding to at least one eigenvector from each of the plurality of UEs.

3. The method of claim 1, wherein the scheduling the at least one UE comprises
determining performance of each of the plurality of UEs for single-user multiple-input multiple-output (SU-MIMO),
determining performance of each of at least one set of UEs for multi-user MIMO (MU-MIMO), the at least one set of UEs being formed based on the plurality of UEs, and
selecting one UE among the plurality of UEs or one set of UEs among the at least one set of UEs for scheduling.

4. The method of claim 1, wherein the scheduling the at least one UE comprises selecting the at least one UE for scheduling based on a metric related to a signal-to-leakage ratio (SLR).

5. The method of claim 1, wherein the determining the precoding vector for each UE comprises determining the precoding vector for each UE to maximize a signal-to-leakage ratio (SLR) for the UE.

6. The method of claim 1, further comprising:
receiving channel quality information (CQI) from the at least one UE; and
selecting at least one modulation and coding scheme (MCS) for the at least one UE based on the CQI from the at least one UE.

7. The method of claim 6, further comprising:
determining at least one backoff-factor for the at least one UE, and
selecting the at least one MCS based further on the at least one backoff-factor.

8. The method of claim 1, further comprising:
receiving noise and interference information from the plurality of UEs; and
scheduling the at least one UE for data transmission based further on the noise and interference information from the plurality of UEs.

9. An apparatus for wireless communication, comprising:
means for receiving channel direction information (CDI) from a plurality of user equipments (UEs), wherein the means for receiving CDI from the plurality of UEs comprises means for receiving at least one eigenvector from each of the plurality of UEs;
means for receiving channel strength information (CSI) corresponding to the CDI from the plurality of UEs, wherein the CSI is received more frequently than the CDI from a UE among the plurality of UEs; and
means for scheduling at least one UE among the plurality of UEs for data transmission based on at least one of the CDI and the CSI from the plurality of UEs, wherein the means for scheduling the at least one UE comprises:
  means for determining a plurality of sets of UEs based on the plurality of UEs;
  means for determining a precoding vector for each UE in each set of UEs based on eigenvectors for all UEs in the set of UEs;
  means for determining a metric for each set of UEs based on precoding vectors for all UEs in the set of UEs, wherein the means for determining the metric for each set of UEs comprises
    means for determining a spectral efficiency for each UE in each set of UEs based on the precoding vectors for all UEs in the set of UEs, and
    means for determining the metric for each set of UEs based on spectral efficiencies for all UEs in the set of UEs; and
  means for selecting a set of UEs for scheduling based on the metric for each set of UEs.

10. The apparatus of claim 9, wherein the means for scheduling the at least one UE comprises means for selecting the at least one UE for scheduling based on a metric related to a signal-to-leakage ratio (SLR).

11. The apparatus of claim 9, wherein the means for scheduling the at least one UE comprises
means for determining performance of each of the plurality of UEs for single-user multiple-input multiple-output (SU-MIMO),
means for determining performance of each of at least one set of UEs for multi-user MIMO (MU-MIMO), the at least one set of UEs being formed based on the plurality of UEs, and
means for selecting one UE among the plurality of UEs or one set of UEs among the at least one set of UEs for scheduling.

12. An apparatus for wireless communication, comprising:
at least one processor configured to receive channel direction information (CDI) from a plurality of user equipments (UEs), receive channel strength information (CSI) corresponding to the CDI from the plurality of UEs, and schedule at least one UE among the plurality of UEs for data transmission based on at least one of the CDI and the CSI from the plurality of UEs, wherein the CDI is received more frequently than the CSI from a UE among the plurality of UEs, wherein the receiving CDI from the plurality of UEs comprises receiving at least one eigenvector from each of the plurality of UEs, wherein the scheduling the at least one UE causes the at least one processor to determine a plurality of sets of UEs based on the plurality of UEs, determine a precoding vector for each UE in each set of UEs based on eigenvectors for all UEs in the set of UEs, determine a metric for each set of UEs based on precoding vectors for all UEs in the set of UEs, and select a set of UEs for scheduling based on the metric for each set of UEs, wherein the determining the metric for each set of UEs causes the at least one processor to determine a spectral efficiency for each UE in each set of UEs based on the precoding vectors for all UEs in the set of UEs, and determine the metric for each set of UEs based on spectral efficiencies for all UEs in the set of UEs.

13. A computer program product, comprising:

a non-transitory computer-readable medium comprising:

code for causing at least one computer to receive channel direction information (CDI) from a plurality of user equipments (UEs), wherein the code for causing the at least one computer to receive CDI from the plurality of UEs comprises code for causing the at least one computer to receive at least one eigenvector from each of the plurality of UEs;

code for causing the at least one computer to receive channel strength information (CSI) corresponding to the CDI from the plurality of UEs, wherein the CSI is received more frequently than the CDI from a UE among the plurality of UEs; and code for causing the at least one computer to schedule at least one UE among the plurality of UEs for data transmission based on at least one of the CDI and the CSI from the plurality of UEs, wherein the code for causing the at least one computer to schedule the at least one UE comprises:

code for determining a plurality of sets of UEs based on the plurality of UEs;

code for determining a precoding vector for each UE in each set of UEs based on eigenvectors for all UEs in the set of UEs;

code for determining a metric for each set of UEs based on precoding vectors for all UEs in the set of UEs, wherein the code for determining the metric for each set of UEs comprises code for determining a spectral efficiency for each UE in each set of UEs based on the precoding vectors for all UEs in the set of UEs, and code for determining the metric for each set of UEs based on spectral efficiencies for all UEs in the set of UEs; and code for selecting a set of UEs for scheduling based on the metric for each set of UEs.

\* \* \* \* \*